United States Patent Office 3,487,101
Patented Dec. 30, 1969

3,487,101
PREPARATION OF METHACRYLIC COMPOUNDS BY DEHYDRATION OF α-HYDROXYBUTYRIC ACID COMPOUNDS
Theodor Völker, Fribourg, Switzerland, and Erika Schindelmann, Dachau, Germany, assignors to Lonza Ltd., Gampel, Valais, Switzerland, a corporation of Switzerland
No Drawing. Continuation-in-part of application Ser. No. 395,918, Sept. 11, 1964. This application May 6, 1968, Ser. No. 727,080
Claims priority, application Switzerland, Sept. 17, 1963, 11,462/63
Int. Cl. C07c 69/54, 57/04
U.S. Cl. 260—486
9 Claims

ABSTRACT OF THE DISCLOSURE

An α-hydroxybutyric acid compound whose α-hydroxy group is free, is heated in the liquid state in the presence of a basic catalyst in a liquid reaction medium comprising a high boiling carboxylic acid or derivatives thereof, thereby obtaining a methacrylic acid compound in high yield.

---

This application is a continuation-in-part of our application Ser. No. 395,918, for "Preparation of Methacrylic Compounds," filed Sept. 11, 1964, now abandoned.

The invention relates to the preparation of methacrylic compounds by dehydration of α-hydroxybutyric acid compounds.

It is known that hydroxy carboxylic acids and their derivatives can be converted by dehydration into the corresponding unsaturated acids and derivatives. However, it is also known that such dehydration proceeds smoothly only with the β-hydroxycarboxylic acids where any of the conventional dehydrating agents can be used for this purpose. In contrast thereto, the dehydration of α-hydroxycarboxylic acids meets with considerable difficulties. In particular, when α-hydroxy isobutyric acid and its esters are subjected to dehydration, generally decomposition to acetone, carbon monoxide, water, acetaldehyde and acetic acid takes place. So far, the best method of dehydrating esters of α-hydroxybutyric acid consisted in using phosphorus type dehydrating agents, where methacrylic acid yields of about 50 percent could be obtained.

We have found that methacrylic acid compounds can be obtained in high yields from α-hydroxybutyric acid and its compounds, whose hydroxy group is free, when the latter compound is slowly added to a liquid reaction medium having a temperature of 180 to 320° C., containing a carboxylic acid, which at said temperature is not decarboxylated and has a boiling point above 180° C., and further containing a basic catalyst. Instead of, or in addition to said carboxylic acid, an ester or other derivatives thereof may be used.

Suitable carboxylic acids are, for instance, stearic acid, palmitic acid, and others. Advantageously, dicarboxylic acids are used which contain the carboxylic groups in α-β or α-γ position and which form at the reaction temperature inner anhydrides; such acids are, for instance, succinic acid, glutaric acid, maleic acid, itaconic acid. Derivatives of said acids which have the same effect, are the esters, preferably the alkyl esters, and particularly the anhydrides. We prefer to use phthalic acid and phthalic anhydride which have a surprising thermal stability in the presence of a basic catalyst.

At time of the reaction, the mole ratio of α-hydroxy isobutyric acid or α-hydroxy isobutyric acid compound to the esterifying component must be at least 1:1. An increase of the amount of the esterifying component has a favorable effect on the yield; therefore, we prefer for continuous operation ratios in the range of 1:500 to 1:1500.

The liquid phase may be constituted by the carboxylic acid compound alone or dissolved in an inert organic solvent, such as high boiling hydrocarbons, more particularly a hydrocarbon having a boiling point above 250° C. If phthalic acid or phthalic anhydride is employed as reaction medium, it is sufficient to add an aliphatic phthalic acid ester, for instance, phthalic acid methyl ester, in an amount of, for instance, 15 percent, in order to prevent undesirable sublimation of the reaction medium. Similarly, if the melting point of the acid or anhydride used as reaction medium is too high, said melting point may be lowered by addition of a suitable ester of the acid.

Depending on its properties, the α-hydroxy isobutyric compounds may be introduced into the reaction medium either dissolved in a solvent or as a melt.

In the particular case that the α-hydroxy isobutyric acid is to be converted to a methacrylic acid ester, the starting compound is preferably dissolved in the respective alcohol, and the alcohol solution is introduced into the reaction medium, whereby it is of advantage to maintain the ratio of alcohol to acid in the range of 5:1 to 20:1.

By changing the concentration of the α-hydroxy isobutyric acid in the respective alcohol, or by modifying the ratio in the composition of the esterifying component, which may consist, for instance, of phthalic acid and phthalic acid ester, the ratio of methacrylic acid and methacrylic ester in the formed mixture may be changed accordingly. By increasing the proportion of alcohol by addition of alcohol or ester, the ratio is shifted in favor of the methacrylic ester; by increasing the concentration of the α-hydroxy isobutyric acid, the ratio is shifted in favor of formation of methacrylic acid.

Suitable basic catalysts are, for instance, the oxides, hydroxides and carbonates of the alkali and alkaline earth metals, alkali metal acetate, and tertiary amines. Preferably, such catalysts are used which contain Na ions. Suitable amounts of catalyst are 0.01 to 5 percent by weight of the reaction medium.

Said catalysts act only when present in the esterifying carboxylic acid containing reaction medium while the α-hydroxy isobutyric acid is added. If an attempt is made to distill already esterified α-hydroxy isobutyric acid, which contains such basic catalyst, no methacrylic acid is obtained.

The invention will be explained more in detail with reference to the following schematic presentation of the reaction and the various examples.

The following formulae illustrate the course of the reaction for the formation of methacrylic acid (3) from α-hydroxy isobutyric acid (1) by means of phthalic anhydride (2) and its re-formation. When using the other various reactants recited above, the reaction proceeds in an analogous manner.

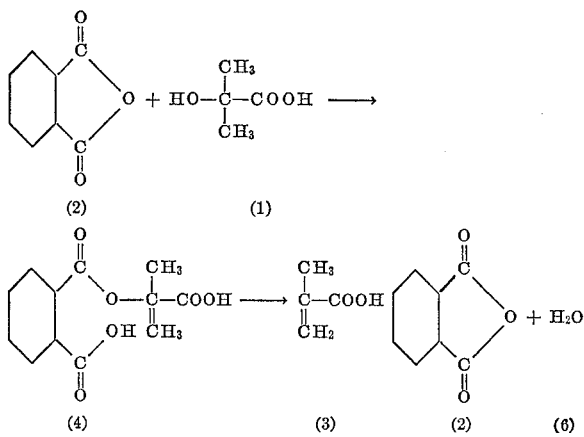

Under the reaction conditions, the phthalic acid formed by the fission of compound (4) (not shown), is at once decomposed to phthalic anhydride, water being split off. The methacrylic acid (3) and the water (6) are continuously distilled off from the reaction medium while the phthalic anhydride remains therein.

EXAMPLE 1

Methacrylic acid and methacrylic acid monomethyl ester

Into a 0.5 liter four-neck flask equipped with a heatable dropping funnel, a stirrer, a thermometer, a gas inlet tube and a Claisen bridge, there was introduced a mixture consisting of 80.0 g. of phthalic anhydride, 50.0 g. of dimethylphthalate, 0.5 g. of caustic soda as catalyst, 0.3 g. of pyrocatechol and 0.3 g. of hydroquinone monomethyl ether as inhibitors.

The mixture was heated to 250–270° C. and a constant $N_2$ current of about one bubble per second was introduced thereonto with agitation. 0.410 moles of $\alpha$-hydroxy isobutyric acid in form of a melt were introduced slowly through the heatable dropping funnel. The volatile reaction products were coarsely condensed at the Claisen bridge and finally at a descending spherical cooler. The gaseous products passed for further condensation a cold trap cooled at −70 to −80° C. and finally through a $CO_2$ absorption vessel.

Determined by the bromine and saponification number, the distillate contained 0.373 moles of a mixture consisting of about 90% of methacrylic acid and about 10% of methacrylic acid methyl ester, and 0.018 mole of unconverted $\alpha$-hydroxy isobutyric acid. This corresponds to a conversion of 95.6 percent and a yield, calculated on reacted $\alpha$-hydroxy isobutyric acid, of 95.2 percent.

EXAMPLE 2

Methacrylic acid and methacrylic acid methyl ester, without $N_2$ current

In an apparatus as described in Example 1, but without passage of a nitrogen current, there was provided a reaction medium consisting of 60.0 g. of glutaric anhydride, 40.0 g. of dimethyl phthalate, 0.5 g. of caustic soda as catalyst, and 0.3 g. of pyrocatechol and 0.3 g. of hydroquinone monomethyl ether as inhibitors, and 0.3 g. of $\alpha$-hydroxy isobutyric acid in form of an about 45 percent methanolic solution were added dropwise at atmospheric pressure and at a temperature of 250° C. In the condensate, there could be determined 0.218 mole of methacrylate, consisting of about 2 parts by weight of methacrylic acid and 1 part by weight of methyl methacrylate, corresponding to a yield of 72.6 percent total methacrylate, calculated on the amount of introduced $\alpha$-hydroxy isobutyric acid. Only traces of acetone were found.

EXAMPLE 3

Methacrylic acid and methacrylic methyl ester, no catalyst

Under the conditions as in example 1, 0.162 mole of $\alpha$-hydroxy isobutyric acid as an about 45 percent methanolic solution were slowly added dropwise at a temperature of 250 to 270° C. and under atmospheric pressure to a reaction medium which consisted of 60.0 g. of phthalic anhydride, 50.0 g. of dimethyl phthalate, 0.3 g. of pyrocatechol as inhibitor, but did not contain caustic soda as catalyst. The distillate contained, in addition to unreacted $\alpha$-hydroxy isobutyric acid, 0.102 mole of a mixture consisting of methacrylic acid and methacrylic acid methyl ester, corresponding to a yield of 63 percent, calculated on the amount of introduced $\alpha$-hydroxy isobutyric acid. The mole ratio of methacrylic acid to methacrylic acid methyl ester was about 4:1. Acetone was found only in trace amounts.

EXAMPLE 4

Free acid; all reactants together

In an apparatus as described in Example 1, but without dropping funnel, there were heated 20.8 g. of $\alpha$-hydroxy isobutyric acid together with 60.0 g. of phthalic anhydride, 0.3 g. of caustic soda, and 0.3 g. of pyrocatechol with stirring and introduction of gentle current of nitrogen at about 250° C. The distillate contained, in addition to unreacted $\alpha$-hydroxy isobutyric acid, 12.2 g. of methacrylic acid corresponding to a yield of 71.0%.

EXAMPLE 5

A reaction vessel as described in Example 1 was charged with a reaction medium consisting of 60.0 g. of phthalic anhydride, 40.0 g. of dimethyl phthalate, 0.5 g. of caustic soda as catalyst, and 0.3 g. of pyrocatechol and 0.3 g. of hydroguinone monomethylether as inhibitor. Then, varying amounts of $\alpha$-hydroxy isobutyric acid in an about 45 percent methanolic solution were charged at a rate of about 0.15 mole/hour through a metering funnel opening inside the liquid reaction medium. During the tests, said medium was heated at about 250° C. and kept in agitation by stirring. A gentle current of nitrogen was passed onto the reaction medium, and the distillate was coarsely condensed at the Claisen bridge and at the downwardly inclined cooler and was passed through a cold trap cooled at −70 to −80° C.

Between the separate tests of this series, summarized in the following Table 1, the reaction bath was cooled, and the conversion of $\alpha$-hydroxy isobutyric acid was interrupted. The results of the test series are convincing evidence that the activity of the reaction medium does not decrease with increasing number of tests.

In the first test, the mole ratio of methacrylic acid to methacrylic acid methyl ester was 1:0.3. Said ratio increased in the subsequent tests and was in test 5 about 1:0.2.

EXAMPLE 6

Ester

In an apparatus as described in Example 1, there were introduced 50.0 g. of $\alpha$-hydroxy isobutyric acid through a metering funnel dipping into a reaction medium consisting of 90.0 g. of phthalic anhydride, 60.0 g. of dimethyl phthalate, 0.5 g. of caustic soda as catalyst, and 0.3 g. of pyrocatechol and 0.3 g. of hydroquinone monoethylether as inhibitors. The reaction liquid was stirred and externally heated to about 240° C. at the

TABLE 1

| Test No. | Introduced amount of α in moles | Total moles of MA and MAM in reaction product | Recovered amount of α in moles | Yield in percent calculated on α | Selectivity in percent | Conversion in percent |
|---|---|---|---|---|---|---|
| 1 | 0.300 | 0.261 | 0.020 | 87.0 | 93.2 | 93.4 |
| 2 | 0.387 | 0.358 | 0.013 | 92.5 | 95.7 | 96.6 |
| 3 | 0.389 | 0.350 | 0.029 | 90.0 | 97.4 | 92.5 |
| 4 | 0.423 | 0.388 | 0.028 | 91.7 | 98.2 | 93.4 |
| 5 | 0.573 | 0.536 | 0.005 | 93.6 | 94.4 | 99.1 |

Explanations:
α=α-hydroxy isobutyric acid.
MA=methacrylic acid.
MAM=methacrylic acid methyl ester.
Selectivity=yield of MA+MAM calculated on conversion of α.

same time, a gentle current of nitrogen was passed over the reaction medium. The distillate was subjected to a coarse condensation in the sloping cooler and passed through a cold trap cooled to −70 to −80° C. In the condensate, there were determined 8.9 g. of methacrylic acid methyl ester and 38.5 g. of α-hydroxy isobutyric acid methyl ester, corresponding to a conversion of 23.1 percent and to a yield of 90.9 percent.

At the second run through the same reaction medium, 48.6 g. of α-hydroxy isobutyric acid methyl ester were introduced under the same conditions. The distillate contained 8.3 g. of methacrylic acid methyl ester and 38.0 g. of α-hydroxy isobutyric acid methyl ester, corresponding to a conversion of 21.8 percent and a yield, calculated on said conversion, of 92.2 percent. After five to six runs, a total yield of 92.2 percent of theory is obtained.

EXAMPLE 7

An apparatus as in Example 1 is charged with a reaction medium which has a temperature in the range of 260 to 280° C. and the following composition: 60.0 g. of phthalic anhydride, 45.0 g. of dibutyl phthalate, 0.5 g. of caustic soda as catalyst, and 0.3 g. of hydroquinone monomethylether and 0.3 g. of pyrocatechol as inhibitors. Under the same conditions as in Example 1, 0.3 mole of α-hydroxy isobutyric acid, dissolved in butanol, are slowly introduced into said medium. In the condensate, there could be determined a total of 0.267 mole of methacrylate as free methacrylic acid and methacrylic acid butyl ester in the ratio of 3:1, corresponding to a yield of 89 percent, and 0.019 mole of α-hydroxy isobutyric acid. This corresponds to a conversion of 93.7 percent and to a yield, calculated on the conversion, of 95 percent.

EXAMPLE 8

In the apparatus of Example 1, a reaction bath was provided which was heated at about 270° C. and consisted of 50.0 g. of stearic acid as esterifying component, 0.5 g. of caustic soda as catalyst, and 0.3 g. each of hydroquinone and induline as inhibitors. A solution of 20.8 g. of α-hydroxy isobutyric acid in 40 ml. of methanol was slowly added dropwise to said bath. The distillate contained besides not dehydrated α-hydroxy isobutyric acid 0.078 mole of methacrylate corresponding to a substantially complete yield at a 40% conversion.

EXAMPLE 9

In the apparatus of Example 1, an about 43% solution of α-hydroxyisobutyric acid in methanol was slowly and dropwise added to a reaction bath of the composition defined in the Table 2 and containing, in addition, pyrocatechol and hydroquinone monomethylether as inhibitors. During the tests, the reaction medium was heated about 270° C. and kept agitated by stirring. A gentle nitrogen current directed on the bath ensured a fast removal of the reaction products out of the reaction space.

The pyrolysis products were condensed in the Claisen bridge and the descending cooler and then passed through the cold trap.

TABLE 2

| Test | HIBS, moles | Reaction medium Carboxylic acid, g. | Catalyst, g. | MAC yield, percent | HIBS reacted, percent | Selectivity percent |
|---|---|---|---|---|---|---|
| 1 | 0.228 | 100 elaidic acid | | 52.2 | 100.0 | 52.2 |
| 2 | 0.238 | do | 3.7 H₃PO₄ | 49.8 | 100.0 | 49.8 |
| 3 | 0.244 | do | 0.5 NaOH | *78.9 | 93.6 | 84.3 |
| 4 | 0.177 | 60 PHTA+50 DMP | | 58.4 | 99.2 | 58.9 |
| 5 | 0.208 | 60 PHTA+43 DMP | 2.5 H₃PO₄ | 43.3 | 100.0 | 43.3 |
| 6 | 0.194 | 60 PHTA+42 DMP | 4.1 p-TSA | 43.7 | 68.2 | 64.2 |
| 7 | 0.183 | 90 PHTA+60 DMP | 3.7 H₃PO₄ | 34.2 | 90.3 | 38.4 |
| 8 | 0.387 | 60 PHTA+40 DMP | 0.5 NaOH | *87.1 | 94.5 | 92.2 |

* With consideration of the amount of HIBS combined with the added NaOH.
HIBS=alpha-hydroxy-isobutyric acid.
PHTA=phthalic anhydride.
DMP=dimethyl phthalate.
TSA=toluene sulfonic acid.

EXAMPLE 10

Comparative tests are described in the following example:

In test A 0.1 mole (9 g.) of hydracrylic acid (β-hydroxypropionic acid, OH—CH₂—CH₂—COOH), In test B 0.1 mole (9 g.) α-hydroxypropionic acid (CH₃—CH(OH)—COOH), and In test C 0.1 mole (10.4 g.) α-hydroxyisobutyric acid (OH—C(CH₃)₂—COOH), were benzoylated in alkaline solution with 0.12 mole of benzoyl chloride. After filtration the benzoylated products were extracted with ether and the ether was distilled off. The benzoylated products were heated with 25 g. alcoholic potassium hydroxide with a concentration of 2 percent of potassium hydroxide under reflux. On acidification with diluted sulfuric acid benzoic acid was precipitated and the solutions were filtered. The filtrates were then distilled with sulfuric acid.

In run A 72 percent by weight of acrylic acid was obtained; in run B and in run C no acrylic acid and no methacrylic acid was obtained.

Similar results could be obtained when the benzoylated products were heated with 250 g. of an alcoholic potassium hydroxide with a concentration of 2 percent by weight of potassium hydroxide.

We claim:

1. A process for preparing a methacrylic compound selected from the group consisting of methacrylic acid and methacrylic esters comprising slowly adding an α-hydroxy isobutyric acid compound selected from the group consisting of α-hydroxy isobutyric acid and α-hydroxy isobutyric acid esters to a liquid medium maintained at a temperature in the range of 180 to 320° C. which contains a basic catalyst and an excess of a compound esterifying the α hydroxy group of said α-hydroxy isobutyric acid compound, which esterifying compound is selected from the group consisting of carboxylic acids, carboxylic anhydrides, and carboxylic acid esters, has a boiling point in excess of 180° C. and is substantially not decarboxylated under the reaction conditions, and recovering the formed methacrylic compound.

2. The process as claimed in claim 1 wherein said carboxylic acid is a dibasic carboxylic acid subject to forming an inner anhydride.

3. The process as claimed in claim 1 wherein the reaction is carried out in a solvent of said α-hydroxy isobutyric acid.

4. The process as claimed in claim 3 wherein said esterifying compound is the solvent.

5. The process as claimed wherein a member of the group consisting of sublimable and high melting acids and anhydrides is used as solvent with addition of an ester of said member.

6. The process as claimed in claim 1 wherein the reaction is carried out in the presence of a polymerization inhibitor.

7. The process as claimed in claim 1 comprising entraining the methacrylic compound by means of an inert carrier gas.

8. A process for preparing a methacrylic acid ester comprising slowly adding α-hydroxy isobutyric acid compound selected from the group consisting of α-hydroxy isobutyric acid and α-hydroxy isobutyric acid esters to a liquid medium maintained at a temperature in the range of 180 to 320° C. which contains a basic catalyst, a lower aliphatic alcohol, and an excess of a compound esterifying the α-hydroxy group of said α-hydroxy isobutyric acid compound, which esterifying compound is selected from the group consisting of carboxylic acids and carboxylic anhydrides, has a boiling point in excess of 180° C. and is substantially not decarboxylated under the reaction conditions, and recovering the forming methacrylic ester.

9. A process for preparing a methacrylic acid ester comprising slowly adding an α-hydroxy isobutyric acid compound selected from the group consisting of α-hydroxy isobutyric acid and α-hydroxy isobutyric acid esters to a liquid medium maintained at a temperature in the range of 180 to 320° C. which contains a basic catalyst, a lower aliphatic alcohol, and a compound esterifying the α-hydroxy group of said α-hydroxy isobutyric acid compound, which esterifying compound is selected from the group consisting of carboxylic acids and carboxylic anhydrides, has a boiling point in excess of 180° C. and is substantially not decarboxylated under the reaction conditions, whereby the mol ratio of the α-hydroxy isobutyric acid compound to the esterifying compound is in the range of 1:500 to 1:1500, and recovering the formed methacrylic ester.

References Cited

UNITED STATES PATENTS

| | | |
|---|---|---|
| 2,183,357 | 12/1939 | Ritchie et al. |
| 2,265,814 | 12/1941 | Ritchie et al. |
| 2,356,247 | 8/1944 | Kirk et al. |
| 2,408,177 | 9/1946 | Ratchford et al. |
| 2,417,749 | 3/1947 | Hagemeyer |
| 2,425,523 | 8/1947 | Filachione et al. |
| 2,464,364 | 3/1949 | Atwood. |
| 3,022,336 | 2/1962 | Sennewald et al. |
| 3,065,260 | 11/1962 | Konz et al. |

FOREIGN PATENTS

| | | |
|---|---|---|
| 657,377 | 3/1938 | Germany. |
| 531,968 | 1/1941 | Great Britain. |

LORRAINE A. WEINBERGER, Primary Examiner

ALBERT P. HALLUIN, Assistant Examiner

U.S. Cl. X.R.

260—410, 475, 485, 526